US006827820B1

(12) United States Patent
Meinander

(10) Patent No.: US 6,827,820 B1
(45) Date of Patent: Dec. 7, 2004

(54) DEGASSING CENTRIFUGAL APPARATUS, PROCESS FOR PUMPING AND DEGASSING A FLUID AND PROCESS FOR PRODUCING PAPER OR BOARD

(75) Inventor: Paul Meinander, Grankulla (FI)

(73) Assignee: POM Technology Oy AB, Helsinki (FI)

( * ) Notice: Subject to any disclaimer, the term of this patent is extended or adjusted under 35 U.S.C. 154(b) by 196 days.

(21) Appl. No.: 09/980,282

(22) PCT Filed: Jun. 2, 2000

(86) PCT No.: PCT/FI00/00497

§ 371 (c)(1),
(2), (4) Date: Apr. 17, 2002

(87) PCT Pub. No.: WO00/74812

PCT Pub. Date: Dec. 14, 2000

(30) Foreign Application Priority Data

Jun. 3, 1999  (FI) ................................................ 991271

(51) Int. Cl.[7] ........................... B01D 19/00; B04B 1/00; D21D 5/26; F04D 7/04
(52) U.S. Cl. ...................... 162/189; 162/190; 162/55; 162/264; 55/409; 55/459.1; 95/261; 96/167; 96/195; 96/208; 210/218; 415/169.1; 417/900
(58) Field of Search ............................... 162/189–190, 162/55, 264; 96/127, 155, 167, 193–196, 204, 208, 216, 217, 243; 95/241, 243, 261, 266; 55/409, 459.1, 400, 470–471, 473, 529, DIG. 32; 210/218; 415/120, 169.1, 169.2, 204, 182.1; 417/118, 409, 900; 494/35, 900

(56) References Cited

U.S. PATENT DOCUMENTS

| 2,278,397 | A | * | 3/1942 | Scheibe et al. ................ 96/217 |
| 2,575,568 | A | * | 11/1951 | Topanelian, Jr. ............. 96/217 |
| 3,203,354 | A | * | 8/1965 | Pedersen ................... 415/169.1 |
| 3,323,465 | A | | 6/1967 | Stillebroer |
| 3,856,483 | A | | 12/1974 | Rumpf et al. |
| 3,942,961 | A | * | 3/1976 | Holliday et al. ............... 96/215 |
| 3,973,930 | A | | 8/1976 | Burgess |
| 4,201,555 | A | * | 5/1980 | Tkach ........................... 95/15 |
| 4,324,557 | A | * | 4/1982 | Wegstedt ..................... 436/132 |
| 4,362,536 | A | * | 12/1982 | Gullichsen .................... 95/261 |

(List continued on next page.)

FOREIGN PATENT DOCUMENTS

| EP | 0 298 442 | | 1/1989 | |
| EP | 337394 A2 | * | 10/1989 | ............. F04D/9/00 |
| GB | 2173712 A | * | 10/1986 | ........... B01D/19/00 |
| WO | 92 03619 | | 3/1992 | |
| WO | WO 9323135 A1 | * | 11/1993 | ........... B01D/19/00 |
| WO | WO 9619276 A1 | * | 6/1996 | ........... B01D/19/00 |
| WO | WO 9808990 A1 | * | 3/1998 | ............. C22B/9/05 |
| WO | WO 200074811 A1 | * | 12/2000 | ........... B01D/19/00 |
| WO | WO 200074812 A1 | * | 12/2000 | ........... B01D/19/00 |

OTHER PUBLICATIONS

Massey, "Mechanics of Fluids", Van Nostrand Reinhold Co., Ltd. London, (1986), pp. 385–410, equivalent to pp. 334–359 in the 1971 edition.

Primary Examiner—José A. Fortuna
(74) Attorney, Agent, or Firm—Browdy and Neimark, P.L.L.C.

(57) ABSTRACT

The invention relates to a degassing centrifugal apparatus such as a pump and to a process for pumping and degassing a fluid. The apparatus has a rotatable hollow rotor connected to a stationary fluid inlet at one end and a stationary liquid outlet at the opposite end and a gas exhaust in the center thereof. The rotor has at its inlet end a bladed wheel with arcuate blades. The bladed wheel accelerates a fluid flow in said rotor inlet end and causes the fluid to rotate at a peripherical velocity higher than the peripherical velocity of said rotor inlet end. The apparatus is especially useful for pumping and degassing backwater in the production of paper or board in a paper machine.

20 Claims, 7 Drawing Sheets

U.S. PATENT DOCUMENTS

| | | | | |
|---|---|---|---|---|
| 4,410,337 A | * | 10/1983 | Gullichsen et al. | 95/22 |
| 4,435,193 A | * | 3/1984 | Gullichsen et al. | 95/19 |
| 4,516,987 A | | 5/1985 | Niggemann | |
| 4,600,413 A | * | 7/1986 | Sugden | 96/216 |
| 4,675,033 A | | 6/1987 | Fellman et al. | |
| 4,908,048 A | * | 3/1990 | Hofmann et al. | 96/196 |
| 5,019,136 A | * | 5/1991 | Elonen et al. | 95/261 |
| 5,039,320 A | * | 8/1991 | Hoglund et al. | 96/214 |
| 5,182,031 A | * | 1/1993 | Lamort | 210/781 |
| 5,567,278 A | * | 10/1996 | Meinander | 162/190 |
| 5,861,052 A | * | 1/1999 | Meinander | 95/243 |
| 5,968,315 A | * | 10/1999 | Meinander | 162/55 |
| 6,142,748 A | * | 11/2000 | Harris et al. | 417/313 |

* cited by examiner

DEGASSING CENTRIFUGAL APPARATUS, PROCESS FOR PUMPING AND DEGASSING A FLUID AND PROCESS FOR PRODUCING PAPER OR BOARD

REFERENCE TO RELATED APPLICATIONS

The present application is the national stage under 35 U.S.C. 371 of international application PCT/FI00/00497, filed Jun. 2, 2000 which designated the United States, and which international application was published under PCT Article 21 (2) in the English language.

BACKGROUND OF THE INVENTION

1. Technical Field of the Invention

The present invention relates to a degassing centrifugal apparatus such as a pump and to a process for degassing and pumping a liquid, especially backwater in the production of paper or board in a paper machine.

2. Prior Art

Backwater drained through a forming fabric in a papermaking process, normally, contains a large amount of entrained air. Since the short circulation of a paper machine requires a particularly constant flow, disturbing air is normally removed by conducting the drained backwater, by means of special pipe or channel systems, from the dewatering elements to an open backwater tank. The deaerated water is then pumped back to the fiber process of the short circulation preceding sheet forming. Other liquids which require air free pumping are, among others, black liquor, deinking sludge and stock, coating colour, etc.

Pumps, which are able to separate gas from a fluid to be pumped are well known as such, but the objective of such pumps is normally just to remove a sufficient portion of the gas to enable regular pumping. The known pumps are not capable of removing enough gas for achieving the degree of freedom of air, which is mostly required for wing the fluid directly for example in a papermaking process without ether deaeration.

Examples of prior art pumps capable of uniformly pumping fluids which contain gas are disclosed in Patents such as U.S. Pat. No. 4,410,337 and U.S. Pat. No. 5,039,320. Said pumps are so called MC-pumps developed for pumping high consistency (about 5% to 20%) pulp which must be fluidized in the suction channel of the pump, whereby air is separated through shear and centrifugal forces. The separated air concentrates in the center of the pump and is discharged by various means. Due to the small separation volume and high viscosity of the fluids to be pumped the separation of liquid and gas is not complete in the prior art pumps mentioned above. Consequently, separation of solid material and liquid from the discharged air is further required as taught for instance in Patent Applications EP 337394 and EP 298442.

The International Patent Application WO 92/03613 discloses a stock feeding arangement and process wherein a fiber suspension is pumped by means of "modified" versions of the MC-pumps mentioned above. However, the specification does not explain how these pumps are to be modified.

Other means for separating gas from fluids, or for pumping fluids containing or developing vapor are disclosed in Patents such as U.S. Pat. Nos. 3,203,354, 3,323,465, 3,856,483, 4,201,555, 3,973,930, 4,516,987, 4,600,413, 4,675,033, 4,908,048 and WO 93/23135.

The same applicant's U.S. Pat. No. 5,861,052, the disclosure of which is included herein by reference, discloses a gas separating pump capable of separating air and water from a mixture thereof. The pump has a fluid inlet at one end and a pumping liquid outlet at the opposite end. Between inlet and outlet there is a hollow elongated gas separating rotor and a generally central outlet for separated gas. At the outlet end of the pump the diameter of the rotor increases smoothly to form a larger diameter pumping zone. The inlet end of die pump is provided with a set of blades for distributing the incoming fluid to the rotor walls and the outlet of the pump Is provided with a blade wheel for pumping the degassed liquid. The apparatus is especially well suited for the gas-free re-cycling of backwater drained through a forming fabric in a papermaking process.

A variant of the above mentioned degassing pump is described in the same applicant's earlier patent application WO 96/19276 wherein a threshold means is provided for ascertaining that the liquid flow at the outlet end is i a tranquil flow mode. The threshold means defines the position at which the transition from rapid tranquil flow will take place via a hydraulic jump.

The hydraulic jump is described, for instance by B. S. Massey; Mechanics of Fluids, 2nd Edition, Van Norsrtand Reinhold Co, Ltd. London 1971, pp 334 to 359, who teaches that a fluid flowing in an open channel cam flow in two distinct modes, either tranquil or rapid. The flow mode of the fluid is determined by the Froude number according to the equation.

$$Fr = u/(h \times g)^{1/2}$$

where Fr is the Froude number, u is the flow speed, h is the layer thickness and g is the force of gravitation. If Fr>1 the flow is rapid and if Fr<1 the flow is tranquil. At a given energy level there is no intermediate flow speed, which means that if a rapid flow is slowed down, a hydraulic jump will take place at the transition between rapid and tranquil flow whereby part of the energy gets lost in turbulence. This phenomenon is known in the art of fluid flow in open channels, and it is utilized among others in water power stations, Since pumps generally operate in a totally fluid filled state and have no open fluid surface there exists no hydraulic jump which is characteristic only for flow in open channels.

Thus, the phenomenon has not previously been utilized in connection with centrifugal separation of gases from liquids nor in the pumping of liquids.

If the liquid flow in the gas separation drum of a centrifugal gas separation device is rapid at any stage, it should preferably be transformed into a tranquil state before being re-moved from the device in order to avoid excessive turbulence and retaining of gas into the liquid at the outlet end. This is particularly important in cases, where the objective is to produce a liquid essentially free of gas, as is the case for instance in the air-free pumping of back-water of a paper machine.

Most prior art pumps operate in a filled state. Some pumping devices with an open surface are known but their axial flow is generally so slow that tranquil flow prevails, or the need for a gas-free state is secondary and a rapid flow at the outlet can be accepted.

OBJECT AND SUMMARY OF THE INVENTION

In prior art open pumps with a high flow rate and a high demand for gas-free liquid, a hydraulic jump will obviously occur at some stage. The exact place of the hydraulic jump varies with the flow conditions and the shape of the air separation drum, and sometimes the hydraulic jump may be instable, causing instability in the function of the pump. The gas separation pump according to the above mentioned earlier parent application WO 96/19276 has an annular threshold m s for defining the position of the hydraulic jump.

An object of the present invention is to improve the function of known processes and apparatuses in order to provide stable conditions when separating a gas from a liquid at a high flow rate. The object of the invention is especially to control the hydraulic conditions in a gas separation device so as to reduce the energy losses. It is a special object of the invention to control the hydraulic conditions in a degassing pump and to reduce the energy losses such as those caused by the hydraulic jump.

The preferred embodiment of the present invention is based on the realization that the energy losses caused by the hydraulic jump may be reduced or eliminated by modifying the geometry of the inlet means of a degassing centrifugal pump. The unique features of the present invention are defined in the appended claims.

Thus, the present invention relates to a degassing centrifugal apparatus comprising a rotatable hollow rotor connected to a stationary fluid inlet at one end and a stationary liquid outlet at the opposite end, and having a gas exhaust in the center thereof, said rotor having at its inlet end a bladed wheel for rotating a fluid in said rotor. According to the invention said bladed wheel comprises a shovel wheel for accelerating the fluid flow in said rotor inlet end and causing said fluid to rotate at a peripherical velocity higher than the peripherical velocity of said rotor inlet end. The shovel wheel has a plurality of shovels extending inwards from said inner wall of said rotor and having an arcuate shape with a leading edge directed towards said stationary inlet and an outlet edge directed towards said inner wall, said outlet edge forming an angle with a line parallel to the centerline of said rotor.

In a preferred embodiment of the invention, the inlet end of said apparatus additionally comprises centrally located throttle means for directing an incoming fluid flow away from the center of the rotor and towards the inner wall of the rotor.

According to a special embodiment of the invention the rotor may comprise two separate rotating bodies rotatable at different speeds, the inlet shovel wheel being attached to the wall of the upstream one of said rotor bodies. The apparatus of the present invention is preferably used as a pump and the outlet end of the apparatus therefor preferably comprises a stationary spiralled peripheral outlet for pumping the degassed liquid.

The outlet end of the rotor preferably comprises a pumping wheel, a turbine wheel or it may also lack a wheel altogether at the outlet end. Thus, the pump according to the present invention may have an enlarged rotor outlet with an enlarged pumping zone as discussed in U.S. Pat. No. 5,861,052 although this is not necessary. In fact, the rotating pump may at the outlet end be configured as a substantially straight tube without enlargement and without any blade wheel at all. Such a pump will, in certain conditions perform its degassing and pumping action in a totally satisfactory manner.

When a fluid is accelerated by means of a shovel, the speed difference between the shovel and the fluid will remain constant, but the flow will change direction according to the shape of the shovel. In a rotating shovel wheel, the speed of the shovel is higher at the periphery than in the center, and the speed difference changes correspondingly.

By modifying the geometry of the shovels of the inlet shovel wheel of the pump, the direction of the flow differential can be directed more peripherically and less axially, as a result of which the rotating speed of the liquid will be higher than the rotating speed of the rotor at this position When the fluid rotates faster than the rotor, the centrifugal force and, thus, the outlet pressure is increased. Also the dynamic energy component, which is transformed to pressure in the outlet pumping spiral, is increased.

In prior art centrifuges, the fluid has been brought to rotate at a rotational speed corresponding to that of the centrifuge. Now we have found, that this causes the fluid fed into the centrifuge to flow with an axial velocity corresponding to the difference between inlet flow speed and the peripherical speed of the centrifuge. This leads to a very rapid flow, which has to be reduced to a tranquil one over a hydraulic jump.

A part of the energy of the axial flow is lost in the hydraulic jump, causing a turbulence. The bigger the axial energy and the lower the centripetal force, the higher will be the hydraulic jump, the bigger the energy loss and the more violent the turbulence. In centrifuges for degassing, like the deaerating pump of U.S. Pat. No. 5,861,052 it has been found, that when the inlet speed is high and the capacity big, the hydraulic jump may re-introduce air into the fluid to be deaerated.

By turning the flow in the direction of the rotation of the centrifuge, the axial flow speed may be reduced, and at the same time, the peripherical flow speed increased. In a preferred embodiment the shovels are designed so as to provide a very high rotational speed component and an axial speed component which is low enough to provide an initial tranquil flow on the rotor wall. In such a case there will be no hydraulic jump and the energy losses are minimized.

The present invention also relates to a process for degassing a fluid by centrifuging, feeding a fluid containing a mixture of liquid and gas into a rotating inlet end of a rotating hollow rotor, accelerating the fluid flow in said rotor inlet end to cause said fluid to rotate at a peripherical velocity higher than the peripherical velocity of said rotor inlet end, bringing said fluid to flow axially along the inner wall of said rotor towards a liquid outlet at the opposite end of said rotor while causing said gas to separate from said liquid by centrifugal force, discharging the resulting degassed liquid at said rotor outlet end, and discharging the gas through a gas exhaust. The liquid is preferably discharged peripherally and the gas centrally.

By using the pump according to the present invention it is possible to provide an essentially complete separation of the gas which is included in the liquid in gaseous (non-dissolved) form from said fluid mixture.

The present invention also relates to improvements in a process for producing paper or board in a paper machine include the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board. The improvement comprises pumping at least a portion of said backwater and/or diluted stock with at least one degassing centrifugal pump in accordance with the present invention.

In a preferred embodiment of the invention the backwater is substantially completely degassed in said pump. The pumping may be performed with one, or preferably with several degassing centrifugal pumps.

A preferred embodiment of the process is provided by connecting the gas discharge to a vacuum source which may be used either to improve the effect of gas separation in the pump, or as a means of suction in a process upstream of the pump, or as means to provide a pressure drop in the inlet sufficient for distributing the fluid over the periphery of the same.

BRIEF DESCRIPTION OF THE DRAWING

The present invention, together with additional objects and advantages thereof will be best understood from the following description, when read in connection with the accompanying drawings, of which.

DETAILED DESCRIPTION OF THE PREFERRED EMBODIMENTS OF THE INVENTION

In the following detailed description of the invention reference is made to the drawings, wherein the same numerals are used for the same or functionally similar parts. It is to be noted that the present pump operates largely in the same manner as the one described in the above mentioned U.S. Pat. No. 5,861,052. Reference is made to the detailed description in said patent, it being clear to those skilled in the art that the many variations in the general construction and operation of the prior art pump are applicable to large extent also to the pump according to the present invention.

Figure 1:
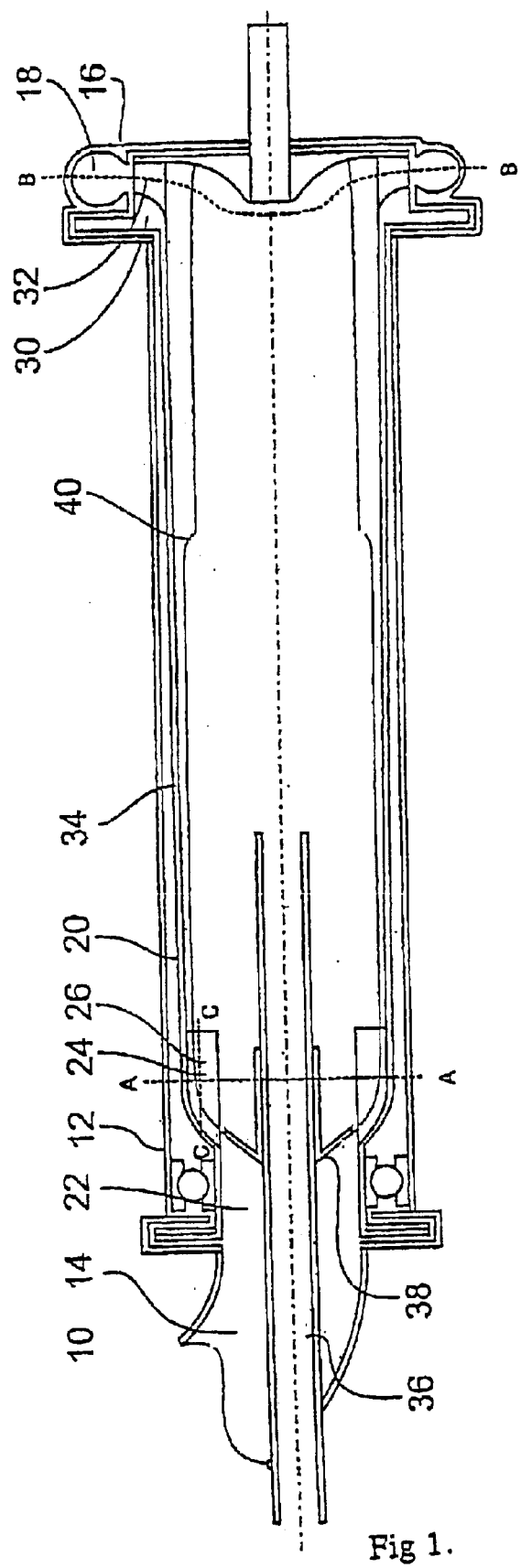
FIG. 1 shows a section of a degassing centrifugal pump according to a preferred embodiment of the invention seen from the side.

In the embodiment of the invention according to FIG. 1 the degassing pump 10 according to the invention comprises a stationary hollow tubular housing 12 with a stationary inlet pipe 14 at one end a stationary outlet spiral 16 with an outlet pipe 18 at the opposite end. Inside the housing 12 there is a hollow rotor 20 rotatably mounted in bearings. The housing 12 forms a closed space around the rotor 20. The rotor 20 comprises a rotatable inlet channel 22 connected to said stationary inlet pipe 14 and a rotatable outlet connected to said stationary outlet spiral 16.

Attached to the inner wall of the rotor 20 there is at the inlet end a set of rotatable blades or shovels 24 forming an inlet bladed wheel 26 and at the outlet end of the pump there is a second set of blades or shovels 32 forming an outlet turbine wheel 30. Between the bladed wheel 26 and the turbine wheel 30 the degassing body of the rotor 20 is formed as a substantially cylindrical drum 34. The drum 34 may also have a more or less conical design with a larger diameter at the outlet end. The drum wall is preferably smooth, i. e. it lacks any blades or ridges other than the shovels at the inlet end 22.

In another embodiment of the invention (not shown) the rotatable inlet and the upstream portion of the rotor may comprise a unit which is rotatable separately from the main de gassing body of the rotor.

At the center of the rotor 20 there is a stationary gas exhaust pipe 36 having on its outer periphery an annular inlet throttle plate 38 slideable along the exhaust pipe (by means not shown). The throttle plate 38 is adapted for distributing the incoming fluid to the inlet bladed wheel 26. The exhaust pipe 36, which in the shown embodiment extends through the center of the rotor inlet, also directs the fluid flow away from the center of the inlet.

The pump bottom is generally flat in the sense that it bas no substantial peripheral walls emending towards the inlet end of the pump but allows liquid to flow freely from said bottom and out through the annular opening which is formed between the rotor wall end and the bottom. The bottom of the pump 10 is shown as being rotatable with the rotor 20.

The bottom of the pump may alternatively be stationary and form part of the housing 12 in which case it is preferable to provide the gas exhaust pipe through the center of the stationary bottom plate.

The inner wall of the drum part 34 of the rotor 20 provides a large rotatable gas separation surface for separating entrained gas from the fluid. The gas separation surface should be sufficiently long for allowing sufficient time for the fluid to settle at the gas separation surface and for any gas enclosed in said fluid to separate, as said fluid flows from inlet to outlet in said rotor 20.

In order to provide sufficient gas separation time and to obtain a favourable ratio between axial flow at said separation surge and the centrifugal force causing the separation, the drum 34 should preferably have a diameter which is smaller than its length. Said diameter should preferably be smaller than half the drum length. A suitable ratio of length to diameter is between 1.5 and 15, preferably between 2 and 10. Most preferably the ratio is between 3 and 8, although there is no definite limit to the length of the drum, except for possible technical difficulties encountered in having extremely long rotating devices.

Figure 2:
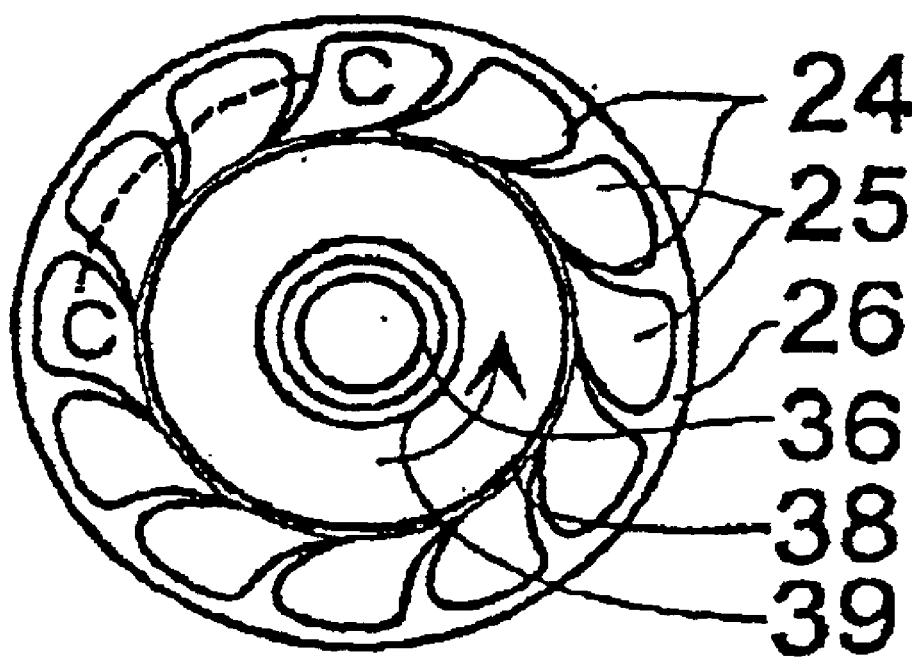
FIG. 2 shows a section of the degassing pump of FIG. 1 along line A—A.

FIG. 2 shows a section A—A of the inlet bladed wheel 26 with the blades 24 attached to the inner wall of the rotor 20 at its inlet end. The blades 24 extend inwards towards the throttle plate 38 in the center of the inlet 22. An arrow indicates the direction of rotation of the rotor 20 and the bladed wheel 26. The blades 24 are arcuate in shape and extend in the direction of rotation leaving channels 25 for the fluid therebetween.

In the center of the rotor 20 the exhaust pipe 36 is shown surrounded by a guide shaft 39 for the throttle plate 38. A suction source may be connected to the gas exhaust 36 for improving the gas separation or increasing the inlet head. Such use of a suction source is particularly preferred when suction is needed at the source of the mixture of gas and liquid.

Figure 3:
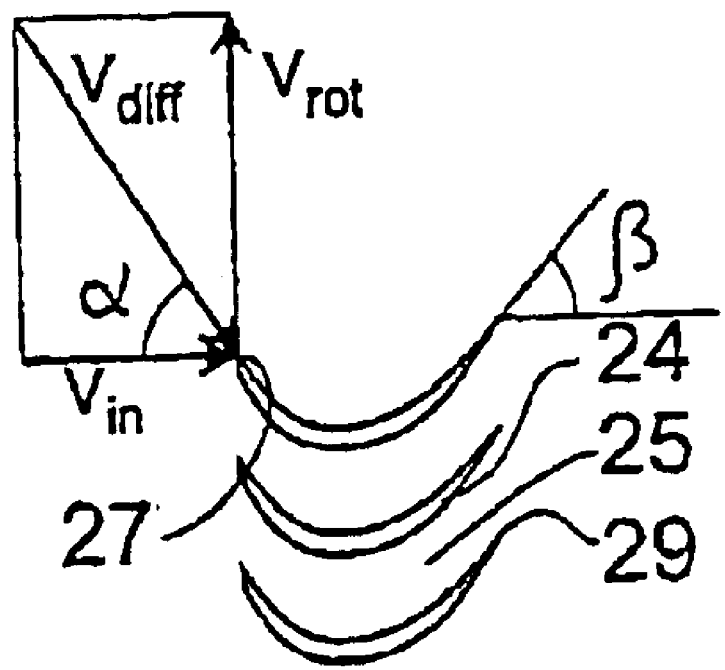
FIG. 3 shows a section of the degassing pump of FIG. 1 along line C—C, and a velocity vector diagram at an inlet shovel of said pump.

FIG. 3 shows the shape of the blades 24 and the channels 25 along section C—C in FIG. 1. The shovels have a leading edge 27 extending towards the inlet pipe 14. The leading edge forms an angle a with a line parallel to the centerline of the rotor. The angle a of the lead- ing edge is advantageously designed so that the leading edge 27 will extend in the direc- tion of the relative inlet speed VDIFF OF THE fluid. The angle a is preferably between 45 and 70°. The relative inlet speed vdiff is the speed difference between the rotor speed vrot and and the bottom. The bottom of the pump 10 is shown as being rotatable with the rotor 20.

The outlet edges 29 of the blades 24 extend towards the inner wall of the rotor 20 and are directed so that they form an angle B with a line parallel to the centerline of the rotor 20. The angle B is preferably between 30 and 80°, more preferably between 40 and 70°. The blade itself forms between leading edge 27 and outlet edge 29 a smooth arcuate blade form.

The curved and angled shape of the blades 24 provides a means for directing incoming fluid towards the rotating drum surface in a direction which has a substantial peripheral component in addition to an axial component and at a peripherical velocity which is greater than the peripherical velocity of the rotating rotor at this position.

Figure 4:
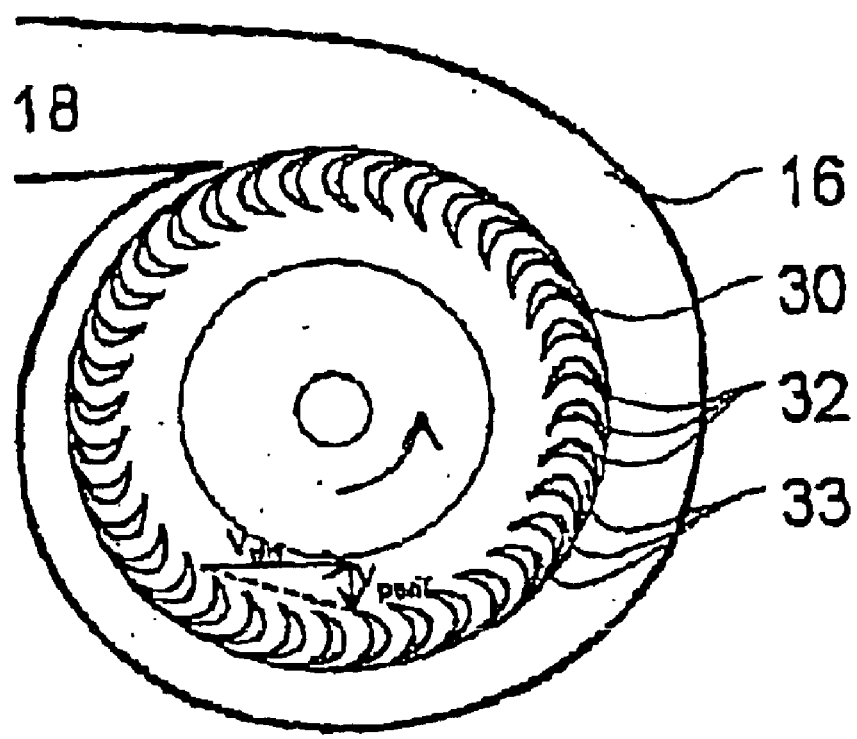
FIG. 4 shows a section of the outlet end of a degassing pump of FIG. 1 along line B—B.

FIG. 4 shows the outlet end of the pump 10 with its turbine wheel 30 at section B—B of FIG. 1. The blades 32 of the turbine wheel 30 form between themselves channels 33 which at their inlet ends are turned so that a fluid having a peripheral velocity higher than that of the rotor 20 can smoothly flow into the channels 33.

The angle which the channels 33 form against the radius of the rotor 20 is preferably chosen according to the ratio between the radial flow velocity $v_{rad}$ of the fluid and the peripheral velocity difference $V_{diff}$ between fluid and shovel inlet so as to provide a desired function at a given constructional degassing and pumping capacity.

At the outer periphery of the turbine wheel 30 the channels 33 are turned in the opposite direction of rotation for decreasing the peripheral velocity of the fluid flow. The channels 33 are preferably narrower at the outer periphery of the turbine wheel 30 than at the inner periphery thereof. The turbine wheel opens into the stationary outlet spiral 16 which generally is spiralled in the direction of the rotation but which may also be spiralled in the direction opposite to the direction of rotation of the rotor.

In the use of the apparatus of the present invention a mixture of gas and a liquid or a liquid suspension is separated into an essentially gas-free liquid and an essentially liquid-free gas. The liquid may be a low viscosity liquid like water or a higher viscosity liquid or suspension like fiber stock. The gas may be air or another gas substantially lighter than the liquid component of the mixture. Thus, the liquid may contain fibers or impurities such as ink particles to an amount, which does not, however, make the fluid mixture excessively viscous.

During operation of the pump embodiment of FIGS. 1 to 4, a fluid which is to be degassed and pumped flows through the inlet pipe 14 and inlet channel 22 and is distributed by the throttle plate 38 to the channels 25 of the rotating inlet bladed wheel 26. The inlet flow velocity vin of the fluid is determined by the inlet pressure. The direction of the flow velocity forms an angle of substantially 90° AGAINST the peripherical rotational velocity VROT of the bladed wheel 26. The velocity difference VDIFF between shovel wheel and fluid will thus, according to the theorem of Pythagoras, be equal to the square root of the sum of the squares of the inlet flow velocity vin of the fluid and the rotational velocity vrot of the rotor:

DIFF=VIN+VROT2

This velocity difference will be substantial maintained through the shovel wheel channels 25 and the fluid will flow into the drum 34 with a peripherical velocity corresponding to the peripherical velocity of the drum plus the peripheral component of the velocity difference, $v_{diff} \times \sin(\beta)$. The fluid will have an axial flow velocity corresponding to the axial velocity component of the velocity difference, $v_{diff} \times \cos(\beta)$.

Due to the shape of the blades 24 the fluid will flow along the drum wall with a velocity having a peripherical component which is higher than the peripheral velocity of the rotor. In other words, the fluid will rotate at a speed which is higher than the speed of the drum.

In a preferred embodiment the fluid flows into the deaeration drum at such a low axial speed that it maintains a tranquil mode of axial flow, i.e. Fr<1. The axial flow may also be moderately rapid or rapid Fr>1 in which case the flow will pass via a hydraulic jump to a tranquil flow mode. A preferred rapid flow is one where Fr is close to 1.

In any case the rotational Speed of the rotor is adjusted so, that at the outlet end the axial velocity is tranquil, i.e. Fr<1. Any transition between flow modes happens in a hydraulic jump 40, where the layer thickness suddenly increases and the axial flow speed decreases correspondingly.

In the hydraulic jump 40 a portion of the energy contained in the fluid is destroyed. The flow speeds should therefore be chose so, that the hydraulic jump eider does not occur or is as small as possible. The existence and position of a hydraulic jump 40 in the drum 34 is determined by the flow speed and the energy losses due to friction losses caused by the velocity difference between drum and fluid flow.

At the turbine wheel at the outlet end, the peripherical speed of the fluid is reduced in a way known to persons skilled in the art. This velocity difference may be inverted in the turbine wheel. Depending on the section and direction of the channels at the outlet of the turbine wheel, it may even be inverted and increased.

The speed difference transfers energy from the fluid to the rotor. The major part of the released kinetic energy of the fluid can be transformed into driving power for the rotor in the turbine wheel.

By shaping the outlet channels 33 of the turbine wheel 30 narrow enough, and directing them peripherally, also a part of the potential energy of the water ring inside the turbine wheel 30 can be transformed into driving power. Thus, the pressure at the outlet may be reduced, compared to prior art pumps.

The outlet spiral 16 is preferably dimensioned for a flow velocity slightly slower than the peripherical velocity at the outlet of the turbine wheel 30. By this arrangement the energy loss in the spiral due to losses in an ejector are minimized and reduced to mere friction losses. As mentioned above, the spiral may be directed in the direction of rotation or counter to said direction.

In the following the operation and dimensions of a pump according to the preferred embodiment of the present invention will be discussed.

The effect of the feeding angles α is illustrated in the Table below:

| | | | |
|---|---|---|---|
| Inlet speed (m/s) | 10 | 10 | 10 |
| Drum speed (m/s) | 15 | 15 | 15 |
| Speed difference (m/s) | 18 | 18 | 18 |
| Feeding angles (1°) | 0 | 45 | 60 |
| Axial flow speed (m/s) | 18 | 13 | 9 |
| Pheriferical flow speed (m/s) | 15 | 28 | 31 |

Thus the axial flow speed is reduced and the pheriferical flow speed increased. The increase reduces the energy of the axial flow by half and increases the energy of peripherical flow and simultaneously the centripetal force as much as four times. When the axial speed is reduced to half, its energy is reduced to one fourth.

The changed conditions may be utilized for reducing the speed of the rotation, reduce the size or increasing the capacity of a given centrifuge at a given deaeration requirement.

A increased peripherical speed and increased centripetal force also increase the pressure at the outlet end of the centrifuge. In a deaerating pump thus also the need for further pumping action is decreased, and the pumping wheel at the outlet end may be reduced in diameter or the size and efficacy of its shovels red. Thus, the pumping wheel may even be eliminated altogether.

For evaluating the degassing function of the degassing apparatus, the formulae given by Topi Helle (in Paperi ja Puu) may be used for calculating a critical bubble, i.e. the diameter of a bubble which would be removed. This theoretical calculation will, of course not exactly correspond to the real process, which is disturbed by turbulences and dispersed material in the fluid. Using deaerating pumps it has, however, been seen that a critical bubble diameter <40 microns yields a sufficient deaeration for papermaking.

With an increasing capacity, there is a tendency for the pressure to rise, wherefore low capacity degassing pumps may also be built according to prior art disclosed in U.S. Pat. No. 5,861,052 if an elevated outlet pressure is needed.

The total outlet pressure, consisting of a dynamic and a static component, may be transformed into static pressure by decelerating it in a pump spiral, like is done in normal centrifugal pumps.

For the papermaking process as explained, for instance in the same applicant's earlier U.S. Pat. No. 5,567,278, an outlet pressure of between 100 and 150 kPa is mostly desired. As seen in the table above, this desired pressure is exceeded in most of the bigger deaerating pumps. The excess pressure may be transformed into mechanical energy by an outlet wheel functioning as a turbine. In this way, the excess kinetic energy is recovered and used for driving the rotor of the deaerating pump, In many cases the axial flow in the pump is rapid at the outlet of the inlet shovel wheel, i.e. the Froude number Fr is >1 ($Fr = v_{axial}/(gh)^{1/2}$, where $v_{axial}$ is the axial velocity, g is the centrifugal acceleration and h is the layer thickness). Before the outlet of the pump, the axial speed has to be slowed down, to a tranquil flow (Fr<1). This means, that the flow should be retarded over a hydraulic jump, as explained in the above mentioned patent application WO 96/19276.

The position of the hydraulic jump will be determined by the kinetic energy of the axial flow and the diameter of the water ring after the jump. Some of the kinetic energy of the fluid will be lost as friction losses due to the speed difference between the deaeration drum and the fluid. The hydraulic jump being caused by decreasing axial speed and/or decreasing centrifugal force, will take place in a position determined by the diameter of the water ring, the energy content of the water before the jump and the flow.

In order to prevent the hydraulic jump from moving back into the inlet shovel wheel it is favourable to give the drum a slightly conical shape, whereby it can be secured, that a hydraulic jump takes place, even if the diameter after the jump exceeds that of the rapid flow water ring at the outlet of the inlet shovel wheel.

If the inlet velocity vin of the fluid is, for instance, 10 m/s and the peripheral velocity of the bladed wheel 26 is 15 m/s, the velocity difference is ($10^2+15^2$), i. e. 18 m/s. At an angle β of 50°, the peripheral velocity component is 13.8 m/s and the axial component 11.5 m/s. The total peripherical velocity is thus 15+13. 8=28.8 m/s and the total velocity of the fluid 30.8 m/s. The kinetic energy contained in the fluid corresponds to the mass flow (kg/s)×30.8² i. e. 950 Ws/kg.

If losses are disregarded, the peripherical velocity of the fluid in the example is 28.8 m/s at the inside of the turbine wheel. If the diameter of the turbine wheel is 10% bigger than that of the inlet shovel wheel, its peripherical velocity is 16.5 m/s, and the velocity difference 12.3 m/s.

The energy released in the turbine wheel corresponds to $(v_{perif\ in}^2 - v_{perif\ out}^2) \times Q$, where $v_{perif\ in}$ is the peripherical velocity at the inside of the turbine wheel and $v_{perif\ out}$ is the peripherical velocity at the exit of the fluid from the turbine wheel.

In the case of a simple inverting of the velocity difference, the peripherical velocity of the fluid in the example is 16.5 m/s−12.3 m/s, i.e. 4.2 m/s at the outlet of the turbine wheel. Thus a power corresponding to $28.8^2-4.2^2=810$ Ws/kg is being recovered as driving power for the rotor, losses disregarded.

Figure 5:
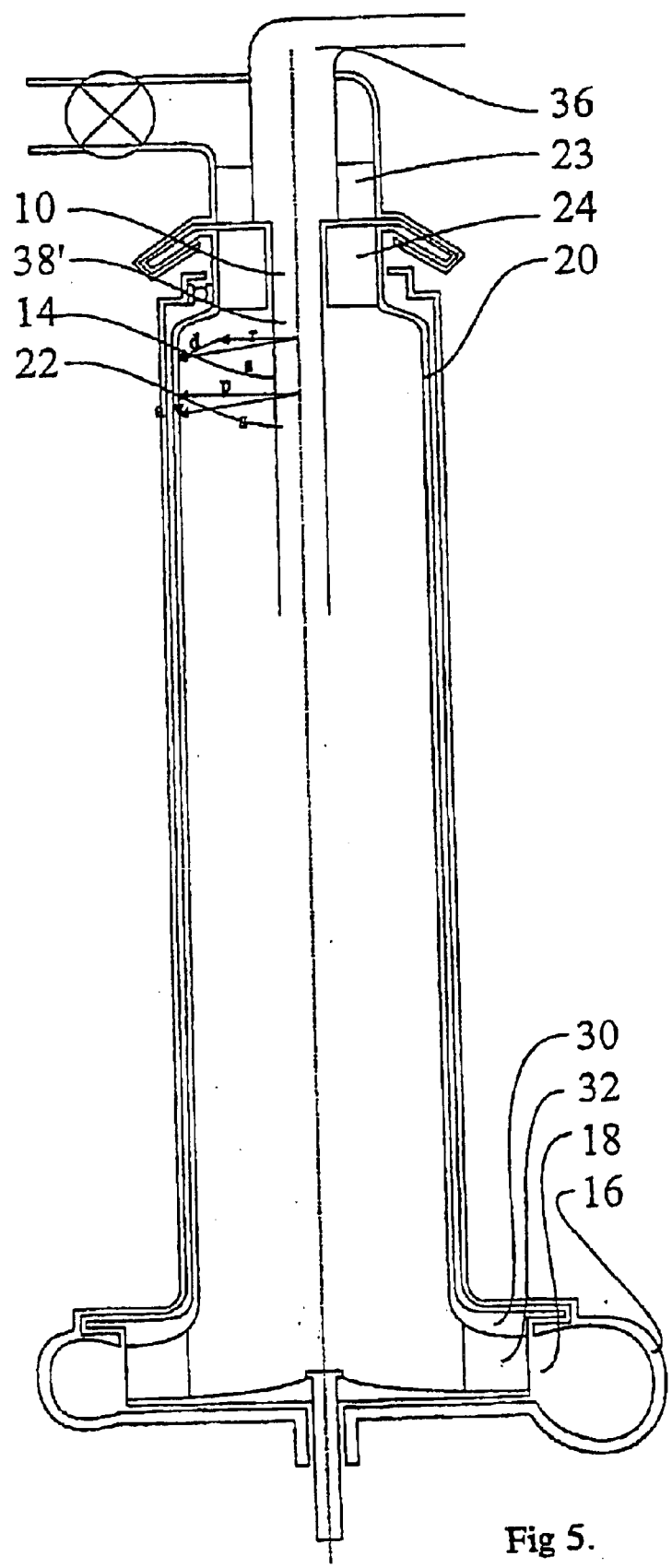
FIG. 5 shows another embodiment of the degassing apparatus according to the invention.

Another and preferred form of the degassing pump according to the present invention is shown in FIG. 5.

In the preferred embodiment according to FIG. 5 the same numerals as in FIG. 1 are used for the same or functionally similar parts. The degassing pump 10 comprises a stationary inlet 14 which is shown provided with a valve for restricting or adjusting the fluid flow to the pump. The stationary outlet spiral 16 surrounds a pump housing which may be constructed as a turbine as in FIG. 1, or which may be designed with a pump wheel as described, for instance in U.S. Pat. No. 5,861,052.

In this embodiment the blades 24 are located in the rotatable inlet 22 of the rotor 20. The arcuate accelerating blades 24 are attached to the inner wall of the rotor inlet 22.

A stationary gas exhaust pipe 36 extends tough the inlet 22 and prevents fluid flow in the center of the rotor inlet and the stationary inlet 14. The portion of the stationary inlet 14 which is connected to the rotor inlet 22 is designed to have a diameter corresponding substantially to that of the rotor inlet. In the shown embodiment the outlet end of the stationary inlet 14 is provided with stationary blades 23 extending from the inner wall of the inlet 14 to the outer wall of the exhaust pipe 36.

The stationary blades 23 are arcuate in shape and form a stationary accelerator which deflects the fluid entering the inlet 14 from an axial direction towards a radial direction. The velocity of the deflected flow will be increased peripherically and the flow entering the rotating accelerator blades 24 in the rotating inlet 22 will therefore have an increased peripherical velocity.

It is evident to those skilled in the art that a rotational direction of the incoming fluid flow may also be provided by other means such as by forming the inlet 14 as a spiral and feeding the fluid tangentially into the rotor inlet 22.

The rotating fluid flow from the stationary accelerator will enter the rotating inlet 22 and its arcuate blades 24 which form a rotating accelerator. The rotating accelerator hits the fluid flow and turns the velocity difference by its arcuate shape so that the fluid starts to rotate with a speed higher than the rotor at this position.

In the embodiment of FIG. 5 the diameter of the rotor 20 immediately after the rotor inlet 22 increases and forms the degassing rotor drum 34. Because of the increased diameter the rotor drum wall bas a higher peripheral velocity than the narrower inlet 22. The fluid flow leaving the inlet 22 will "drop" into the wider drum and the difference in peripherical velocity between fluid and rotor will be reduced. In the preferred situation the peripherical velocity of the fluid is the same as the peripherical velocity of the drum wall and the only relative flow on the drum wall is in the axial direction.

The shape of the arcuate blades 24 determines the relationship between axial and radial component of the velocity of the fluid. Since the axial flow component is basically not affected by the entry of the fluid into the drum, the shovel design will determine the axial flow velocity along the drum wall.

Figure 6:
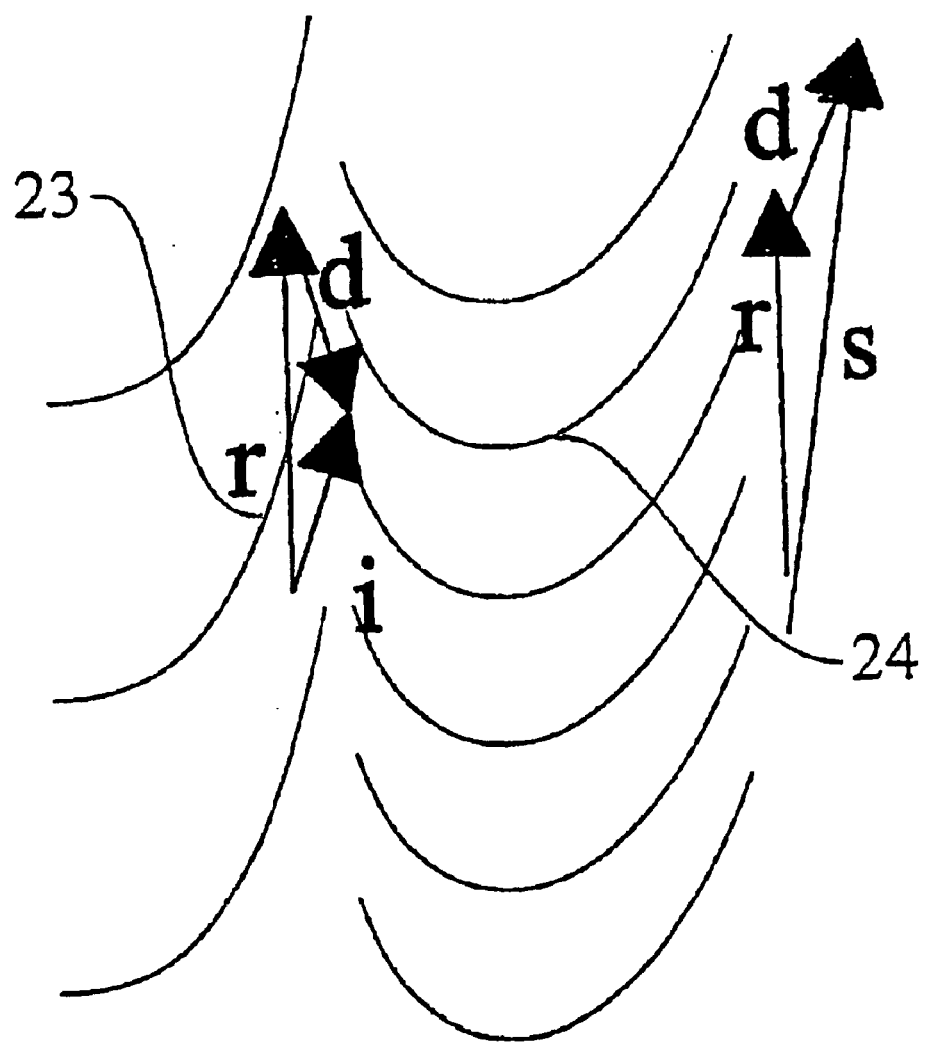
FIG. 6 shows the accelerating principle and speed vectors in the rotor inlet in the pump according to FIG. 5.

FIG. 5 and FIG. 6 are provided with velocity vectors explaining how the velocity of the fluid and rotor changes in the various accelerating means. In FIG. 6 the stationary accelerator blades 23 and the rotating accelerator blades 24 are shown as contours merely.

The vectors are designated by letters as follows:

i=the inlet velocity of the fluid (determined by the pressure drop in the stationary accelerator)

r=the peripherical (rotational) velocity of the rotating accelerator d=the velocity difference in the rotating accelerator s=the fluid velocity at the outlet from the rotating accelerator p=the peripherical velocity of the drum (larger than the peripherical velocity r of the accelerator in proportion to the difference in diameters)

a=the axial velocity, the difference between the drum velocity and the fluid velocity (the axial component of the fluid velocity s).

A study of the velocity vectors of FIGS. 5 and 6 shows that the fluid flow is accelerated in the stationary accelerator. The fluid enters the rotating accelerator, which turns the velocity difference so that the fluid rotates faster than the rotor. The fluid leaves the inlet and enters the wider drum having a peripherical velocity corresponding to the peripherical velocity of the fluid.

In the rotating accelerator the velocity difference is maintained but its direction is changed. In the drum the difference in peripherical velocities is lost and there only remains the axial component of the fluid velocity. The axial component of the thud flow is small and hence no hydraulic jump is created. The hydraulic energy losses are minimized.

The rotational energy of the fluid is maintained and can be used in the outlet end either as pressure for pumping, or any excess energy may be recovered by means of a turbine su as the one described in connection with FIG. 1.

Figure 7:
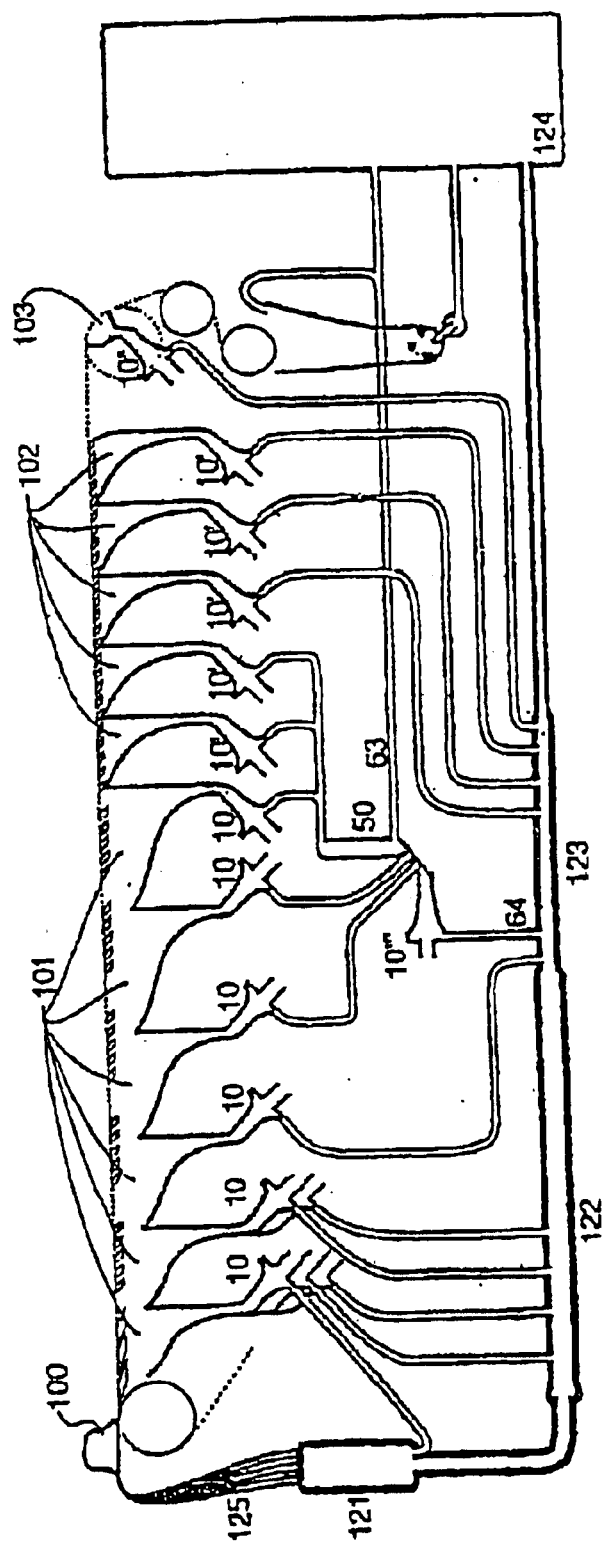
FIG. 7 shows the application of degassing centrifugal pumps according to the invention in a papermaking process.

The gas separation pump according to the present invention is especially well suited for recycling paper machine backwater into the short circulation fiber process. FIG. 7 represents a particularly favourable use of gas separation pumps in a process according to the same applicant's U.S. Pat. No. 5,567,278. The disclosure of which is incorporated herein by reference. It is obvious for the person skilled in the art that the present invention offers significant improvement also to conventional papermaking processes, by increasing recycling speed of backwater and eliminating the need for huge backwater tanks.

The solution according to FIG. 7 represents a papermaking process, where thin stock is fed through a head box 100 onto a forming wire, for the forming of a web. Backwater draining through the forming wire is collected in drainage boxes 101, suction boxes 102 and the suction roll 103 and flows directly into degassing pumps 10, 10' and 10", according to the present invention. The degassing pumps 10' and 10" relating respectively to suction boxes and to a suction roll may be connected to a vacuum source (not shown) for providing the suction needed in said suction boxes and said suction roll.

The degassing pumps 10, 10' and 10" separate the air connived in the backwater and feed the backwater as separate air free flows to various dilution points in the primary fiber process. Said fiber process goes from stock preparation 124 through a mixer 123, centrifugal cleaner 122, screen 121 and stock distributor 125 to the headbox 100 and further to paper web forming.

The degassing pumps according to the present invention, thus provide means for fast and direct recycling of essentially air free backwater into the fiber process of a papermaking machine wet end.

A process for producing paper or board according to the present invention may be operated in principle according to normal papermaking operations which include the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board.

Although the degassing apparatus according to the present invention is primarily aimed at achieving an essentially total separation of gas and liquid when pumping a liquid, the pump will also provide great advantages in processes where prior art gas separation pumps are insufficient for pumping fluids wherein the gas is very hard to separate.

The present invention has been described principally as a pump solution relating to the paper industry. It is, however, obvious for the persons skilled in the art that the apparatus can be used for many other purposes when gas is to be removed from a liquid or a liquid suspension.

What is claimed is:

1. A degassing centrifugal apparatus comprising a rotatable hollow rotor (20) connected to a stationary fluid inlet (14) at one end and a stationary liquid outlet (16) at the opposite end, and having a gas exhaust (36) in the center thereof, said rotor (20) having at its inlet end a bladed wheel (26) for rotating a fluid in said rotor (20), said bladed wheel (26) having a plurality of blades (24) extending inwards from said inner wall of said rotor (20) and having an arcuate shape with a leading edge (27) directed towards said stationary inlet (14) and an outlet edge (29) directed towards said inner wall, said outlet edge (29) forming an angle (p) with a line parallel to the centerline of said rotor (20), the shape of said arcuate blades being effective for accelerating the fluid flow in said rotor inlet end and causing said fluid to rotate at a peripherical velocity higher than the peripherical velocity of said rotor inlet end.

2. An apparatus according to claim 1, wherein said leading edge (27) of said arcuate blade (24) forms an angle ($\alpha$) with a line parallel to the centerline of said rotor (20).

3. An apparatus according to claim 1, wherein said angle ($\alpha$) is between 45° and 70° and said angle ($\beta$) is between 30° and 80°.

4. An apparatus according to claim 1, wherein said hollow rotor (20) comprises an elongated tubular or conical gas separation drum (34) of an essentially circular cross-section with a smooth surface.

5. An apparatus according to claim 4, wherein said bladed wheel (26) is located in the inlet (22) of said rotor (20) and said gas separation drum (34) is connected directly to said rotor inlet (22) and has a diameter which is significantly larger than the diameter of said rotor inlet (22).

6. An apparatus according to any one of the preceding claims 1 to 5, wherein said stationary inlet (14) is provided with means for directing a fluid flow at a tangential direction into said rotor inlet (22).

7. An apparatus according to claim 6, wherein said means for directing the fluid flow comprise stationary blades (23) extending from a tubular wall of said stationary inlet (14).

8. An apparatus according to claim 1, wherein said stationary inlet (14) is provided with a valve for regulating the fluid flow therethrough.

9. An apparatus according to claim 1, wherein said hollow rotor (20) comprises two separately rotatable bodies, the first of said bodies comprising a rotatable inlet (22) with said inlet bladed wheel (26) and the second one comprising a generally tubular rotatable gas separating drum (34).

10. An apparatus according to claim 1, wherein said inlet end of said rotor (20) comprises throttle means (38, 38') for directing an incoming fluid flow away from the center of said rotor (20).

11. An apparatus according to claim 1 wherein said rotor (20) comprises at its outlet end a pumping zone for pumping degassed liquid.

12. An apparatus according claim 1, wherein said fluid inlet (14) and said liquid outlet (16) are connected to each other by a tubular housing (12), forming a stationary closed space enclosing said rotor (20).

13. An apparatus according to claim 1 wherein a vacuum source is connected to said gas outlet (36).

14. A process for degassing a fluid by centrifuging, comprising feeding a fluid containing a mixture of liquid and gas into a rotating inlet end of a rotating hollow rotor, accelerating the fluid flow in said rotor inlet end to cause said fluid to rotate at a peripherical velocity higher than the peripherical velocity of said rotor inlet end, bringing said fluid to flow axially along the inner wall of said rotor towards a liquid outlet at the opposite end of said rotor while causing said gas to separate from said liquid by centrifugal force, discharging the resulting degassed liquid at said rotor outlet end, and discharging the gas through a gas exhaust.

15. A process according to claim 14, wherein said peripherical velocity of said fluid flow is accelerated prior to being fed into said rotor inlet.

16. A process according to claim 14 or 15, wherein the fluid flow leaving said rotor inlet is directed into a rotor portion having a peripherical velocity substantially corresponding to the peripherical velocity of said fluid flow in said rotor inlet.

17. A process according to claim 14, wherein the feeding and rotation of said fluid is performed such that the axial flow on the rotating wall of said rotor inlet has a Froude number close to 1, and at said rotor outlet has a Froude number Fr<1.

18. A process according to claim 17, wherein the axial flow on the rotating wall of said rotor inlet has a Froude number Fr<1.

19. A process according to claim 14, wherein the degassed liquid is discharged peripherally at said rotor outlet at a pumping pressure.

20. An improvement in a process for producing paper or board in a paper machine including the steps of providing a papermaking stock of pulp; diluting said stock in one or more stages with backwater drained through a forming wire of said paper machine; feeding said stock through a head box of said paper machine onto said forming wire; forming a web on said forming wire while allowing water from said stock to drain through said wire; feeding said web through a press section and a drying section of said paper machine to provide paper or board, said improvement comprising pumping at least a portion of said backwater and/or diluted stock with at least one degassing centrifugal apparatus comprising a rotatable hollow rotor (20) connected to a stationary fluid inlet (14) at one end and a stationary liquid outlet (16) at the opposite end, and having a gas exhaust (36) in the center thereof, said rotor (20) having at its rotor inlet (22) a bladed bladed wheel (26) for accelerating the flow of said backwater and/or stock in said rotor inlet end and causing said fluid to rotate at a peripherical velocity higher than the peripherical velocity of said rotor inlet end, wherein said bladed wheel(26) comprises a plurality of blades (24) extending inwards from said inner wall of said rotor (20) and having an arcuate shape with a leading edge (27) directed towards said stationary inlet (14) and an outlet edge (29) directed towards said inner wall, said outlet edge (29) forming an angle ($\beta$) with a line parallel to the centerline of said rotor (20).

* * * * *